(12) United States Patent
Covezzi et al.

(10) Patent No.: US 9,574,026 B2
(45) Date of Patent: Feb. 21, 2017

(54) METHOD FOR IMPROVING THE OPERABILITY OF AN OLEFIN POLYMERIZATION REACTOR

(71) Applicant: BASELL POLYOLEFINE ITALIA S.R.L., Milan (IT)

(72) Inventors: Massimo Covezzi, Ferrara (IT); Gabriele Mei, Ferrara (IT); Maria Di Diego, Ferrara (IT); Piero Gessi, Ferrara (IT); Pietro Baita, Ferrara (IT); Roberta Pica, Ferrara (IT)

(73) Assignee: Basell Poliolefine Italia S.r.l., Milan (IT)

(*) Notice: Subject to any disclaimer, the term of this patent is extended or adjusted under 35 U.S.C. 154(b) by 0 days.

(21) Appl. No.: 14/915,063

(22) PCT Filed: Aug. 5, 2014

(86) PCT No.: PCT/EP2014/066801
§ 371 (c)(1),
(2) Date: Feb. 26, 2016

(87) PCT Pub. No.: WO2015/028265
PCT Pub. Date: Mar. 5, 2015

(65) Prior Publication Data
US 2016/0208026 A1 Jul. 21, 2016

(30) Foreign Application Priority Data

Aug. 26, 2013 (EP) .................................... 13181717

(51) Int. Cl.
| | | |
|---|---|---|
| *C08F 2/00* | (2006.01) |
| *C08F 4/00* | (2006.01) |
| *C08F 210/00* | (2006.01) |
| *C08F 110/02* | (2006.01) |
| *C08F 10/00* | (2006.01) |

(52) U.S. Cl.
CPC .............. *C08F 110/02* (2013.01); *C08F 10/00* (2013.01); *C08F 2410/02* (2013.01)

(58) Field of Classification Search
CPC ......... C08F 10/00; C08F 110/02; C08F 2/005; C08F 2/007; C08F 2410/02
USPC ............................................ 526/74, 89, 348
See application file for complete search history.

(56) References Cited

U.S. PATENT DOCUMENTS

| | | | |
|---|---|---|---|
| 7,476,715 B2 | 1/2009 | McKay et al. | |
| 8,735,514 B2 | 5/2014 | Baita et al. | |
| 2003/0211961 A1* | 11/2003 | Lai ..................... | B01D 19/0409 510/475 |
| 2009/0105428 A1 | 4/2009 | Mihan | |
| 2012/0241373 A1 | 9/2012 | Na et al. | |
| 2013/0030066 A1 | 1/2013 | Hahn et al. | |

FOREIGN PATENT DOCUMENTS

| | | |
|---|---|---|
| CN | 101466742 A | 6/2009 |
| CN | 103119069 A | 5/2013 |

OTHER PUBLICATIONS

PCT International Search Report and the Written Opinon—Mailed Oct. 8, 2014 for Corresponding PCT/EP2014/066801.

* cited by examiner

*Primary Examiner* — William Cheung

(57) ABSTRACT

The present technology relates to a method of introducing a supported antistatic compound that does not comprise a transition-metal-based catalyst component for use in an olefin polymerization reactor. In some embodiments, the methods disclosed herein avoid the formation of polymer agglomerates in the reactor and minimize potentially negative effects on catalyst yield.

4 Claims, No Drawings

METHOD FOR IMPROVING THE OPERABILITY OF AN OLEFIN POLYMERIZATION REACTOR

This application is the U.S. National Phase of PCT International Application PCT/EP2014/066801, filed Aug. 5, 2014, claiming benefit of priority to European Patent Application No. 13181717.3, filed Aug. 26, 2013, the contents of which are incorporated herein by reference in its entirety.

BACKGROUND OF THE INVENTION

The present technology relates to a process for the polymerization of olefins carried out in the presence of a supported antistatic compound. The technology also relates to a supported antistatic compound, a process for its preparation and its use in a process for the polymerization of olefins.

In continuous polymerization processes, particularly in gas-phase processes for the polymerization of olefins, there is the need to "face up" to the formation of polymer agglomerates in the polymerization reactor, which are capable of introducing many negative effects in such processes. For example, they can disrupt the discharge of polymer from the reactor by plugging the polymer discharge valves. Furthermore, polymer agglomerates may cover the fluidization grid of the reactor, resulting in a loss in fluidization efficiency.

It has been found that the presence of fine polymer particles, or fines, in the polymerization medium favors the formation of polymer agglomerates. These fines may be present as a result of introducing fine catalyst particles or breakage of the catalyst and polymer particles within the polymerization medium. The fines are believed to deposit and electrostatically adhere to the inner walls of the polymerization reactor and the equipment for recycling the gaseous stream, for example, the heat exchanger. If the fines remain active, then the particles will grow in size, resulting in the formation of agglomerates, which may also be caused by the partial melting of the polymer itself. These agglomerates when formed within the polymerization reactor tend to be in the form of sheets. Agglomerates can also partially plug the heat exchanger designed to remove the heat of polymerization reaction.

Several solutions have been proposed to resolve the formation of agglomerates during gas-phase polymerization processes such as the deactivation of the fine polymer particles, the control of the catalyst activity and the reduction of the electrostatic charge by introducing antistatic agents inside the reactor.

EP 0359444 describes the introduction of small amounts of an activity retarder into a polymerization reactor in order to keep the polymerization rate or the content of transition metal in the polymer produced constant without forming agglomerates.

U.S. Pat. Nos. 4,803,251 and 5,391,657 describe methods for reducing polymer sheeting by adding to the reactor additives that generate positive or negative charges depending on whether the electrostatic level detected in the reactor is negative or positive respectively. In U.S. Pat. No. 5,391,657, SiO2 is mentioned among the possible negative charge generating additives.

EP 0560035 discloses a polymerization process in which an anti-fouling compound selected from alkyldiethanolamines is used to eliminate or reduce the build-up of polymer particles on the walls of a gas-phase polymerization reactor that may be fed at any stage of the gas-phase polymerization process in an amount greater than 100 ppm by weight with respect to the produced (co)polymer.

WO2007/041810 discloses supporting an olefin polymerization catalysts together with a polysulfone antistatic on a porous metal oxide and using such supported antistatic catalyst in olefin polymerization.

WO2012/041810 and WO2012/041811 disclose methods for feeding antistatic components to a polymerization reactor by preparing a catalyst suspension incorporating the antistatic components and successively transferring the catalyst suspension to the polymerization reactor.

A side effect of the use of antistatic compounds in polymerization processes is that they also act as "catalyst poisons" and therefore, even if used in small amounts, reduce polymer yields. None of the methods proposed hitherto has successfully addressed the problematic formation of polymer agglomerates in the reactor while at the same time minimizing negative effects on catalyst yield, which may advantageously be achieved by the process of the present technology.

SUMMARY OF THE INVENTION

In some embodiments, the present disclosure provides an olefin polymerization process comprising the steps of:
  (a) contacting an antistatic compound with a support in the absence of a transition-metal-based catalyst component to obtain a supported antistatic compound;
  (b) introducing the supported antistatic compound into a polymerization reactor; and
  (c) polymerizing an olefin in the polymerization reactor in the presence of a catalyst.

The term "antistatic compound," as used in the present description, includes:
  antistatic substances capable of neutralizing the electrostatic charges of the polymer particles; and
  cocatalyst deactivators that partially deactivate the aluminum alkyl cocatalyst used as a component of the olefin polymerization catalyst, provided that they do not substantially inhibit the overall polymerization activity.

Consequently, an "antistatic compound" according to the present disclosure is any substance that may prevent, eliminate or substantially reduce the formation of polymer on any equipment of the polymerization plant, including sheeting on reactor walls and the deposition of polymer agglomerates onto the gas recycle line.

In certain embodiments, antistatic compounds can be selected from:
  1) hydroxyesters with at least two free hydroxyl groups, such as glycerol monostearate (GMS90) and glycerol mono palmitate;
  2) alcohols containing up to 7 carbon atoms;
  3) ketones containing up to 7 carbon atoms;
  4) polyepoxidate oils, such as epoxidized soyabean oil (for example EDENOL D81) and epoxidized linseed oil (for example EDENOL D316);
  5) polyglycerol esters, such as diglycerol monooleate (for example GRINSTED PGE 080/D);
  6) alkyldiethanolamines of the general formula R—N(CH$_2$CH$_2$OH)$_2$ wherein R is an alkyl radical comprising between 10 and 20 carbon atoms; and
  7) amides of formula R—CONR'R", wherein R, R', and R" may be the same or different, comprising a saturated or unsaturated hydrocarbon radical having 1 to 20 carbon atoms.

In some embodiments, the antistatic compounds are added to the dispersion tank of step (a) in the form of powder or micro-beads.

In certain embodiments, the antistatic sold under the trademark ATMER® 163 (synthetic mixture of alkyldiethanolammines of formula R—N(CH$_2$CH$_2$OH)$_2$, where R is an alkyl radical containing 13-15 carbon atoms, may be used. In further embodiments, natural-based alkyldiethanolamines may be used, for instance ARMOSTAT® 410LM.

The present technology may be used in a liquid or solid form. The physical state of the antistatic depends on melting point of the compound and on the selected temperature during its use.

In some embodiments, the support is in the form of finely divided supports and may be an organic and/or inorganic solid. For instance, the support component can be a porous support such as talc, a sheet silicate such as montmorillonite, mica, an inorganic oxide and/or a finely divided polymer powder (e.g. a polyolefin or a polymer having polar functional groups).

Examples of inorganic supports for use in the present technology include silicon dioxide, aluminum oxide and mixed oxides of the elements calcium, aluminum, silicon, magnesium or titanium and oxide mixtures. Other inorganic oxides which can be used alone or in combination with the above mentioned oxidic supports, for example, MgO, CaO, AlPO$_4$, ZrO$_2$, TiO$_2$, B$_2$O$_3$ and mixtures thereof. Additional inorganic support materials are inorganic halides such as MgCl$_2$ or carbonates such as Na$_2$CO$_3$, K$_2$CO$_3$, CaCO$_3$, MgCO$_3$, sulfates such as Na$_2$SO$_4$, Al$_2$(SO$_4$)$_3$ and BaS0$_4$, and nitrates such as KNO$_3$, Mg(NO$_3$)$_2$ or Al(NO$_3$)$_3$.

The inorganic support can be subjected to a thermal treatment that may remove adsorbed water. In certain embodiments, the treatment is carried out at temperatures from 40 to 1000° C., including from 50 to 600° C., with drying at 50 to 200° C. carried out under reduced pressure and/or a blanket of inert gas (e.g. nitrogen). The inorganic support may be calcined at temperatures from 200 to 1000° C. for modifying the structure of the solid and/or to modify the —OH concentration on the surface.

The support can also be treated chemically using customary desiccants such as metal alkyls such as aluminum alkyls, chlorosilanes, SiCl$_4$, and methylaluminoxane. The treatment of silica gel with NH$_4$SiF$_6$ or other fluorinating agents may be used to fluorinate the silica gel surface, and treatment of the silica gels described herein with silanes containing nitrogen-, fluorine- or sulfur-containing groups may be used to further modify the silica gel surfaces. Appropriate treatment methods are described, for example, in WO 00/031090.

Organic support materials such as finely divided polyolefin powders (e.g. polyethylene, polypropylene or polystyrene) can also be used and, in some embodiments, are dried to avoid the presence of moisture, solvent residues and/or other impurities by appropriate purification and drying operations before use. It is also possible to use functionalized polymer supports comprising, e.g. polystyrene, polyethylene, polypropylene and/or polybutylene, further comprising functional groups, for example ammonium or hydroxyl groups, with at least one of the catalyst components being immobilized in certain embodiments. Polymer blends can also be used.

The use of silica gels as solid support component allows for the use of particles whose size and structure make them suitable as supports for olefin polymerization. In certain embodiments, spray-dried silica gels comprising spherical agglomerates of smaller granular particles, i.e. primary particles, may be used. The silica gels can be dried and/or calcined before use.

The silica gels described herein may be used as finely divided powders having a mean particle diameter D50 of 5 to 200 μm, including from 10 to 150 μm, from 15 to 100 μm and from 20 to 70 μm, and may comprise pore volumes of 0.1 to 10 cm$^3$/g, including from 0.2 to 5 cm$^3$/g, and specific surface areas of 30 to 1000 m$^2$/g, including from 50 to 800 m$^2$/g and from 100 to 600 m$^2$/g. Typical silica gels suitable for use in the present technology are available, e.g. from W. R. Grace & Co, Maryland, USA.

In some embodiments, the support is generally dry, i.e. it is not suspended in a solvent and the residual moisture content is less than 5% by weight, such as less than 2% by weight and less than 0.5% by weight, based on undried (moist) support.

The antistatic compound is, in some embodiments, applied at a concentration from 10 to 60% wt, including from 20 to 50% wt and from 30 to 40% wt, per gram of support component.

The support component can optionally be brought into contact with an organometallic compound before being brought into contact with the antistatic compound. Organometallic compounds for use in the present technology are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-nheptylmagnesium, n-butyl-n-octylmagnesium, tri-n-hexylaluminum, triiscibutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof.

The supported antistatic compound displays very good powder flow.

Catalyst components that can be used in the polymerization process of the invention are Ziegler-Natta catalyst components comprising a magnesium halide, a titanium compound having at least a Ti-halogen bond, and optionally electron donor compounds. The magnesium halide may be, in some embodiments, MgCl$_2$ in active form, which is widely known from the patent literature as a support for Ziegler-Natta catalysts. The titanium compounds are, in certain embodiments, TiCl$_4$ and TiCl$_3$. Ti-haloalcoholates of formula Ti(OR)$_{n-y}$X$_y$, where n is the valence of titanium, y is a number between 1, n−1 X is halogen, and R is a hydrocarbon radical having from 1 to 10 carbon atoms, can also be used.

Other solid catalyst components which may be used are those based on a chromium oxide supported on a refractory oxide, such as silica, and activated by a heat treatment. Catalysts obtainable from those components may consist of chromium (VI) trioxide chemically fixed on silica gel. These catalysts may be produced under oxidizing conditions by heating the silica gels that have been doped with chromium (III)salts (precursor or precatalyst). During this heat treatment, the chromium(III) oxidizes to chromium(VI), the chromium(VI) is fixed and the silica gel hydroxyl group is eliminated as water.

Additional solid catalyst components which may be used are single-site catalysts supported on a carrier such as metallocene catalysts comprising:

at least a transition metal compound containing at least one n bond; and at least a cocatalyst selected from an alumoxane or a compound able to form an alkylmetallocene cation.

The catalysts may be optionally subjected to prepolymerization, such as in a loop reactor, before being fed to the polymerization reactor. The prepolymerization of the catalyst system may be carried out at a low temperature in a range from 0° C. to 60° C.

Olefins that can be polymerized in the process according to the present technology are α-olefins of the general formula $CH_2=CHR$, where R is hydrogen or a hydrocarbon radical having from 1 to 12 carbon atoms. Examples of such olefins are ethylene, propylene, 1-butene, 1-hexene and 1-octene. The olefins can be polymerized either alone to form homopolymers or in combination with dissimilar olefins to produce copolymers.

The process of the present disclosure can be carried out in any polymerization plant comprising one or more liquid-phase and/or gas-phase polymerization reactors. Suitable liquid-phase reactors are loop reactors and continuously stirred tank reactors (CSTR). Suitable gas-phase reactors include fluidized bed reactors, stirred bed reactors and reactors having two interconnected polymerization zones as described in EP 0782587 and EP 1012195.

The process according to the present technology is very effective in avoiding the formation of polymer agglomerates in the polymerization reactor and, at the same time, demonstrating surprisingly high polymerization activities.

According to another object, the present technology provides a supported antistatic compound that does not comprise a transition-metal-based catalyst component.

According to a further object, the present technology provides a process for the preparation of a supported antistatic compound comprising the step of contacting an antistatic compound with a support in the absence of a transition-metal-based catalyst component.

A still further object of this technology is the use of a supported antistatic compound free of a transition-metal-based catalyst component in a process for the polymerization of olefins.

Further advantages and characteristics of the present invention will appear clear from the following examples, which are provided for illustrative purposes only and are not intended to limit the scope of the invention.

EXAMPLES

Test Methods

Melt index E (MIE)
Determined according to ASTM-D 1238, condition E (190° C./2.16 kg).
Poured bulk density (PBD)
Determined according to DIN-53194.
Particle size distribution (PS D)
Determined by using a Tyler Testing Sieve Shaker RX-29 Model B available from Combustion Engineering Endecott, provided with a set of six sieves, according to ASTM E-11-87, of number 5, 7, 10, 18, 35, and 200 respectively.

Example 1

Silica Dehydration

Silica was loaded into a vessel and was dehydrated at 200° C. under vacuum (26 mbar) for 8 hours (lab conditions) with a residual water content of between 2000 and 5000 ppm.

Antistatic (GMS) Supportation

Iso-hexane was loaded into a stirred reactor and was heated up to 55° C. GMS was loaded in the reactor up to the amount of 75 g/L. After 3 hours, silica support was loaded in the reactor up to the amount of 175 g/L with respect to the starting iso-hexane, with a total load of GMS and silica of 250 g/L and a ratio between GMS and silica of 30%/70% by weight. After 30 minutes of contact between the dissolved GMS and silica, the drying step started. The equipment was placed under vacuum (26 mbar) in order to remove the iso-hexane and the temperature was raised according to a ramp up to 90° C. in order to remove all iso-hexane. The solid (GMS on silica) was then cooled to room temperature and unloaded from the vessel.

Preparation of Prepolymerized Catalyst

A magnesium chloride and alcohol adduct containing about 3 mols of alcohol was prepared following the method described in Example 2 of U.S. Pat. No. 4,399,054, but working at 2000 rpm instead of 10000 rpm. The adduct was subjected to a thermal treatment, under nitrogen stream, over a temperature range of 50-150° C. until a weight content of 25% of alcohol was reached. Into a 2 L four-necked round flask, purged with nitrogen, 1 L of $TiCl_4$ was introduced at 0° C. Then, at the same temperature, 70 g of a spherical $MgCl_2$/EtOH adduct containing 25 wt % of ethanol and prepared as described above were added under stirring. The temperature was raised to 140° C. over 2 h and maintained for 60 min. The stirring was discontinued, the solid product was allowed to settle and the supernatant liquid was siphoned off. The solid residue, having an average particle size of about 60 micrometers, was then washed once with heptane at 80° C. and five times with hexane at 25° C., dried under vacuum at 30° C. and analyzed. Into a 260 $cm^3$ glass reactor provided with stirrer, 351.5 $cm^3$ of hexane at 20° C. and 7 g of the catalyst prepared as above described were introduced and stirred at 20° C. The internal temperature was kept constant and 5.6 $cm^3$ of tri-n-octylaluminum (TNOA) in hexane (about 370 g/l) were slowly introduced into the reactor, with the temperature brought to 10° C. After 10 minutes of stirring, 10 g of propylene were carefully introduced into the reactor and kept at the same temperature for 4 hours. The consumption of propylene in the reactor was monitored and the polymerization was discontinued when a theoretical conversion of 1 g of polymer per g of catalyst was reached. The whole contents of the reaction vessel were filtered and washed three times with hexane at a temperature of 20° C. (50 g/l). After drying the resulting pre-polymerized catalyst was analyzed and found to contain 1.1 g of polypropylene per g of catalyst.

Preparation of Catalyst Suspension

A dispersion tank with an internal diameter of 14.5 cm is used. This tank is equipped with a stirrer, an external water jacket for the temperature regulation, a thermometer and a cryostat. The following components were used to prepare the catalyst suspension:
the above indicated Ziegler Nana catalyst powder; and
White Oil 70 (white oil Winog 70) having a viscosity of 70 cStokes at 40° C.
1005 g of White Oil 70 were fed into the dispersion tank at room temperature (25° C.). Successively, 300 g of catalyst powder were loaded to the tank containing the oil, while continuously maintaining under stirring the dispersion tank.

After the introduction of the catalyst, the resulting suspension is maintained under stirring conditions for 30 minutes, with the temperature of the dispersion tank reduced to 13° C. The velocity of the stirring device is adjusted to 85 rpm during the mixing of the components of the suspension.

The obtained suspension has a catalyst concentration of about 252 g/l (grams of catalyst for liter of oil). The catalyst suspension contains the antistatic compound in a weight ratio GMS90/catalyst of 0.13.

Preparation of Catalyst Paste 431 g of molten vaseline grease BF (thickening agent) were fed to the dispersion tank containing the catalyst suspension at a feed temperature of 80° C. The molten thickening agent is slowly fed for 3 minutes, while stirring the catalyst suspension in the dispersion tank with a velocity of 85 rpm. The catalyst suspension is maintained at a temperature of 13° C. during the addition of the molten vaseline grease. The molten thickening agent rapidly solidifies on contact with the catalyst suspension. After the introduction of the molten vaseline, the components of the catalytic paste were maintained under stirring at 85 rpm for a time of 90 minutes. During this time the temperature in the dispersion tank is kept at 13° C.

The obtained catalytic paste has a weight ratio grease/oil of about 0.43, while the concentration of the solid (catalyst+antistatic) in the catalytic paste is equal to about 170 g/l.

Catalyst Activation

The obtained catalytic paste is withdrawn by the dispersion tank by a dosing syringe and is then continuously transferred by means of two dosing syringes to a first catalyst activation vessel, then to a second, then to a third. Triisobutyl-aluminium (TIBAL) is used as the cocatalyst with a weight ratio of TIBAL/catalyst of 1.5. No external donor is used and propane is fed as a diluent to the activation vessels. The components were pre-contacted in three activation vessels at a temperature of 40° C. for 19, 44 and 25 minutes, respectively. The activated catalytic paste is discharged from the activation vessel and is continuously fed to a gas-phase fluidized bed reactor for the polymerization of olefins.

Polymerization

The activated catalytic paste and the supported GMS were introduced into the fluidized bed reactor, where ethylene is polymerized to produce high density polyethylene (HDPE). The polymerization is operated in the presence of propane as a polymerization diluent and hydrogen as the molecular weight regulator. The polymerization conditions and the composition of the gaseous reaction mixture were indicated in Table 1. The characterization of the HDPE discharged from the reactor is reported in Table 2.

Example 2C (Comparison)

Example 1 is repeated with the only difference that during the preparation of catalyst suspension 40 g of microbeads of GSM were added to the suspension of catalyst powder in oil, so that the resulting catalytic paste incorporates GMS and no supported GMS was used. The polymerization conditions and the composition of the gaseous reaction mixture are indicated in Table 1. The characterization of the HDPE discharged from the reactor is reported in Table 2.

Examples 3 and 4

The procedure set forth in Example 1 was repeated, except that a different amount of GMS was used.

The polymerization conditions and the composition of the gaseous reaction mixture are indicated in Table 1. The characterization of the HDPE discharged from the reactor is reported in Table 2.

Example 5C (Comparison)

The procedure set forth in Example 2 was repeated, except that the same catalyst as in Examples 3 and 4 has been used.

The polymerization conditions and the composition of the gaseous reaction mixture are indicated in Table 1. The characterization of the HDPE discharged from the reactor is reported in Table 2.

Example 6

The procedure set forth in Example 1 was repeated, except that the catalyst components were pre-contacted in two activation vessels at a temperature of 40° C. for 19 and 44 minutes respectively, followed by a pre-polymerization treatment in a third vessel at a temperature of 40° C. for 35 minutes with a ratio ethylene/catalyst of 10 g/g.

The polymerization conditions and the composition of the gaseous reaction mixture are indicated in Table 1. The characterization of the HDPE discharged from the reactor is reported in Table 2.

By comparing the data on polymer particle size, the examples produced in accordance with the present technology significantly reduced the amount of "fines" versus the comparative examples, further resulting in a significant reduction of fouling inside the fluidized bed reactor and in the equipment arranged along the gas recycle line (compressor and heat exchanger). It is also notable that the examples produced in accordance with the present technology show a higher specific mileage.

TABLE 1

| | | Process conditions | | | | | |
| | | Example | | | | | |
| | | 1 | 2C | 3 | 4 | 5C | 6 |
|---|---|---|---|---|---|---|---|
| T | ° C. | 80 | 80 | 80 | 80 | 80 | 80 |
| P | barg | 24 | 24 | 24 | 24 | 24 | 24 |
| Residence time | h | 2.1 | 2.3 | 2.1 | 2.1 | 2.3 | 2.2 |
| GMS/HDPE | ppm | 89 | 97 | 55 | 92 | 99 | 73 |
| C2— | % mol | 5.4 | 7.5 | 5.3 | 5.6 | 6.6 | 5.8 |
| H2/C2— | — | 2.8 | 2.6 | 2.6 | 2.7 | 2.7 | 2.9 |

TABLE 1-continued

| | | Process conditions | | | | | |
|---|---|---|---|---|---|---|---|
| | | Example | | | | | |
| | | 1 | 2C | 3 | 4 | 5C | 6 |
| Mileage | g/g | 4252 | 4108 | 4500 | 4101 | 4027 | 4189 |
| Specific Mileage | g/g · bar · h | 1466 | 942 | 1612 | 1385 | 1068 | 1303 |

TABLE 2

| | | HDPE characterization | | | | | |
|---|---|---|---|---|---|---|---|
| | | Example | | | | | |
| | | 1 | 2C | 3 | 4 | 5C | 6 |
| MIE | g/10' | 118 | 145 | 132 | 143 | 159 | 139 |
| PBD | g/cc | 0.448 | 0.492 | 0.449 | 0.459 | 0.483 | 0.451 |
| P50 | μm | 1375.6 | 1146.8 | 1244.4 | 1206.5 | 1220.6 | 1214.9 |
| <500 | % wt | 3.7 | 8.1 | 9.7 | 14.2 | 5.6 | 12.3 |
| <300 | % wt | 1.5 | 3.2 | 3.5 | 4.3 | 2.2 | 5.7 |
| <180 | % wt | 0.6 | 1.2 | 1.2 | 1.4 | 0.8 | 2.1 |
| <125 | % wt | 0.3 | 0.5 | 0.4 | 0.5 | 0.4 | 0.8 |
| <106 | % wt | 0.2 | 0.3 | 0.2 | 0.2 | 0.3 | 0.4 |

What is claimed is:

1. An olefin polymerization process comprising the steps of:
   a. contacting an antistatic compound with a support in the absence of a transition-metal-based catalyst component to obtain a supported antistatic compound;
   b. introducing the supported antistatic compound into a polymerization reactor; and
   polymerizing an olefin in the polymerization reactor in the presence of a catalyst.

2. The process of claim 1, wherein the antistatic compound is a hydroxyesters with at least two free hydroxyl groups.

3. The process of claim 2, wherein the antistatic compound is glycerol monostearate.

4. The process according to claim 1, wherein the support is silica gel.

* * * * *

UNITED STATES PATENT AND TRADEMARK OFFICE
CERTIFICATE OF CORRECTION

PATENT NO. : 9,574,026 B2
APPLICATION NO. : 14/915063
DATED : February 21, 2017
INVENTOR(S) : Massimo Covezzi et al.

Page 1 of 1

It is certified that error appears in the above-identified patent and that said Letters Patent is hereby corrected as shown below:

In the Specification

Column 1    Line 61    Delete "SiO2" and insert --$SiO_2$--

Column 3    Line 31    Delete "BaS0$_4$," and insert --$BaSO_4$,--

Column 4    Line 32    Delete "triiscibutylaluminum," and insert --triisobutylaluminum,--

Column 5    Line 55    Delete "(PS D)" and insert --(PSD)--

Column 6    Line 61    Delete "Nana" and insert --Natta--

Column 8    Line 57    In Table 1, delete "C2—" and insert --$C_2$- --

Column 8    Line 63    In Table 1, delete "H2/C2—" and insert --$H_2/C_2$- --

Signed and Sealed this
Tenth Day of September, 2019

Andrei Iancu
*Director of the United States Patent and Trademark Office*